US008473657B2

(12) United States Patent
Zhou et al.

(10) Patent No.: US 8,473,657 B2
(45) Date of Patent: *Jun. 25, 2013

(54) HIGH SPEED PACKET FIFO OUTPUT BUFFERS FOR SWITCH FABRIC WITH SPEEDUP

(75) Inventors: Ting Zhou, Orinda, CA (US); Sheng Liu, San Jose, CA (US); Ephrem Wu, San Mateo, CA (US)

(73) Assignee: LSI Corporation, Milpitas, CA (US)

( * ) Notice: Subject to any disclaimer, the term of this patent is extended or adjusted under 35 U.S.C. 154(b) by 644 days.

This patent is subject to a terminal disclaimer.

(21) Appl. No.: 12/729,231

(22) Filed: Mar. 22, 2010

(65) Prior Publication Data

US 2010/0238938 A1 Sep. 23, 2010

Related U.S. Application Data

(60) Provisional application No. 61/210,908, filed on Mar. 23, 2009, provisional application No. 61/210,914, filed on Mar. 23, 2009.

(51) Int. Cl.
*G06F 3/00* (2006.01)
*G06F 5/00* (2006.01)
*G06F 13/00* (2006.01)

(52) U.S. Cl. ............... 710/111; 710/45; 710/52

(58) Field of Classification Search .............. 710/45, 710/52, 111
See application file for complete search history.

(56) References Cited

U.S. PATENT DOCUMENTS

| | | | |
|---|---|---|---|
| 4,622,631 A | 11/1986 | Frank et al. | |
| 5,623,698 A | 4/1997 | Stephenson et al. | |
| 5,892,766 A | 4/1999 | Wicki et al. | |
| 5,943,283 A | 8/1999 | Wong et al. | |
| 6,038,630 A | 3/2000 | Foster et al. | |
| 6,195,335 B1 | 2/2001 | Calvignac et al. | |
| 6,515,965 B1 * | 2/2003 | Hou et al. | 370/233 |
| 6,567,564 B1 | 5/2003 | van der Wal | |
| 6,636,932 B1 | 10/2003 | Regev et al. | |
| 7,089,346 B2 | 8/2006 | Cebulla et al. | |
| 7,234,018 B1 | 6/2007 | Purcell et al. | |
| 7,461,208 B1 | 12/2008 | Caprioli et al. | |
| 7,596,142 B1 | 9/2009 | MacAdam | |
| 2002/0029214 A1 | 3/2002 | Yianilos et al. | |
| 2002/0165985 A1 | 11/2002 | Chen et al. | |
| 2003/0033276 A1 | 2/2003 | Cheng et al. | |
| 2003/0123468 A1 | 7/2003 | Nong | |
| 2004/0255209 A1 | 12/2004 | Gross | |
| 2005/0027920 A1 | 2/2005 | Fitzsimmons et al. | |
| 2005/0152352 A1 | 7/2005 | Jun et al. | |
| 2006/0256783 A1 | 11/2006 | Ayrapetian et al. | |
| 2007/0016756 A1 | 1/2007 | Hsieh et al. | |
| 2007/0226798 A1 | 9/2007 | Sibert | |
| 2008/0162793 A1 | 7/2008 | Chu et al. | |
| 2010/0260198 A1 | 10/2010 | Rojas-Cessa et al. | |

FOREIGN PATENT DOCUMENTS

JP H02-271444 11/1990

* cited by examiner

*Primary Examiner* — Farley Abad

(57) ABSTRACT

Described embodiments provide a first-in, first-out (FIFO) buffer for packet switching in a crossbar switch with a speedup factor of m. The FIFO buffer comprises a first logic module that receives m N-bit data portions from a switch fabric, the m N-bit data portions comprising one or more N-bit data words of one or more data packets. A plurality of one-port memories store the received data portions. Each one-port memory has a width W segmented into S portions of width W/S, where W/S is related to N. A second logic module provides one or more N-bit data words, from the one-port memories, corresponding to the received m N-bit data portions. In a sequence of clock cycles, the data portions are alternately transferred from corresponding segments of the one-port memories in a round-robin fashion, and, for each clock cycle, the second logic module constructs data out read from the one-port memories.

17 Claims, 15 Drawing Sheets

CYCLE 2

CYCLE 3

CYCLE 4

CYCLE 5

CYCLE 10

CYCLE 12 (REWIND)

HIGH SPEED PACKET FIFO OUTPUT BUFFERS FOR SWITCH FABRIC WITH SPEEDUP

CROSS-REFERENCE TO RELATED APPLICATIONS

This application claims the benefit of the filing date of U.S. provisional application Nos. 61/210,914 and 61/210,908, filed Mar. 23, 2009, the teachings of which are incorporated herein in their entireties by reference.

The subject matter of this application is related to U.S. patent application Ser. No. 12/430,438 filed Apr. 27, 2009 and Ser. No. 12/729,226 filed Mar. 22, 2010, the teachings of which are incorporated herein in their entireties by reference.

BACKGROUND OF THE INVENTION

1. Field of the Invention

The present invention relates to buffers for a switch fabric for inter-connection between multiple modules in a communication system.

2. Description of the Related Art

A network switch is a data switching device that forwards a data unit ("packet") from a source network component to a destination network component. Typically, a network switch receives a packet from the source network component via an input port and sends a packet to the destination network component via an output port. A network switch for packet switching might be implemented as a crossbar switch. A crossbar switch (also known as a "crosspoint switch" or a "matrix switch") inter-connects a plurality of input ports and output ports to each other. A crossbar switch having P inputs and Q outputs has a switch fabric matrix with P×Q crosspoints where connections between input ports and output ports are made. Packets arriving at one of the input ports might be routed to one or more specified output ports. For example, a packet might be routed to just a single specified output port (unicast), routed to all output ports (broadcast), or routed to multiple specified output ports (multicast).

Some crossbar switches might employ switch fabric speed-up, meaning that the internal data rate of the switch is higher than the data rate of the input and output links. Speed-up might be implemented by employing a wider data bus within the switch fabric than the data bus for the input and output ports. For example, a switch fabric might have input and output (I/O) ports with a data bus width of N, and the switch fabric might have a data bus width of m*N, where m is the speed-up factor. A crossbar switch might employ first-in, first-out (FIFO) I/O buffers at each input and output port to facilitate re-sizing data packets between the bus width of an I/O port and the switch fabric. The I/O buffers might beneficially employ dual port memories to allow simultaneous reads and writes of the memory. However, dual port memories can be expensive, and thus might not be available for implementations requiring large buffers.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a first-in, first-out (FIFO) buffer for packet switching in a crossbar switch with a speedup factor of m. The FIFO buffer comprises a first logic module that receives m N-bit data portions from a switch fabric, the m N-bit data portions comprising one or more N-bit data words of one or more data packets. A plurality of one-port memories store the received data portions. Each one-port memory has a width W segmented into S portions of width W/S, where W/S is related to N. A second logic module provides one or more N-bit data words, from the one-port memories, corresponding to the received m N-bit data portions. In a sequence of clock cycles, the data portions are alternately transferred from corresponding segments of the one-port memories in a round-robin fashion, and, for each clock cycle, the second logic module constructs data out read from the one-port memories.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a high speed packet input FIFO buffer and a high speed packet output FIFO buffer are provided for a switch fabric. The FIFO buffers provide for a higher data throughput to the switch fabric than the port throughput. As described herein, embodiments of the present invention employ single-port memories to provide the FIFO buffers. Described embodiments allow for both read operations from, and write operations to, the buffers every clock cycle.

Figure 1:
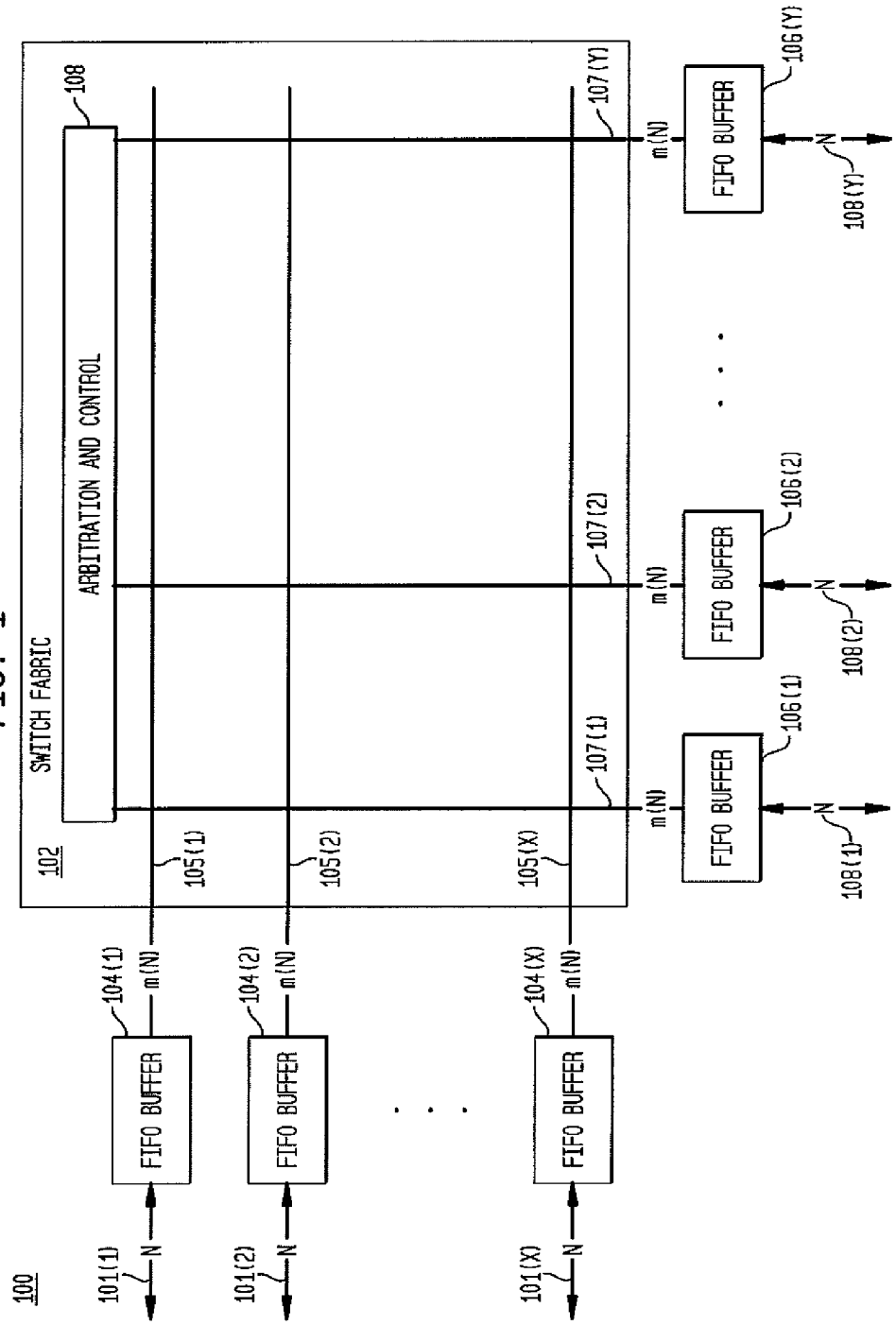
FIG. 1 shows a block diagram of a switch fabric with speedup employing high speed packet FIFO buffers operating in accordance with exemplary embodiments of the present invention.

FIG. 1 shows a block diagram of a switch system, shown as switch system 100. As will be described herein, switch system 100 might be configured to implement a high-throughput interconnection between multiple data modules via optical fiber. As shown, switch system 100 includes switch fabric 102. Switch fabric 102 might generally be configured to allow data at any input port to the switch fabric to be transferred to any one or more output ports of the switch fabric. In exemplary embodiments, switch fabric 102 has X input ports and Y output ports, shown generally as ports 105(1) through 105(X) and ports 107(1) through 107(Y). In FIG. 1, ports 105(1) through 105(X) might generally be configured as input ports, and ports 107(1) through 107(Y) might generally be configured as output ports. Switch fabric 102 is configured to switch data between ports 105(1) through 105(X) and one or more of ports 107(1) through 107(Y). Communication between ports might generally be controlled and configured by Arbitration and Control module 108.

As shown in FIG. 1, each input port 105(1) through 105(X) is coupled to a corresponding FIFO input buffer, shown as FIFO buffers 104(1) through 104(X). Similarly, each output port 107(1) through 107(Y) is coupled to a corresponding FIFO output buffer, shown as FIFO buffers 106(1) through 106(Y). As shown in FIG. 1, one or more data packets might be provided to each FIFO input buffer, for example, FIFO buffer 104(1). Each data packet might include one or more data words, each data word of width N bits, which are provided as input signals 101(1) through 101(X). As indicated in FIG. 1, each input data signal, shown as input signals 101(1) through 101(X), has a data width of N bits. Data In has width N-bits, which might include one or more control bits. These control bits might be used to indicate various control data within switch system 100.

For example, the control bits might indicate that a particular data word is the start of a packet, the end of a packet, that a packet should be multicast, or might include error correction codes (ECC). A FIFO input buffer operating in accordance with embodiments of the present invention might append one or more control bits to the N-bit data, and a FIFO output buffer operating in accordance with embodiments of the present invention might remove one or more control bits from the data. For example, in embodiments of the present invention, a FIFO input buffer might receive N-bit Data In, which includes two control bits and one or more ECC bits. A first control bit and the one or more ECC bits might be removed as the data is output from the FIFO input buffer. For example, the FIFO input buffer might provide (N−1)-bit Data Out to the switch fabric. Similarly, a FIFO output buffer might receive (N−1)-bit Data In from the switch fabric, remove the control bit, and output (N−2)-bit Data Out. Furthermore, the N-bit data might contain one or more ECC bits, which might be added or removed as the data flows through the FIFO buffer. In some embodiments, the one or more ECC bits might be sent to the switch fabric to protect the entire data path including the FIFO input buffer, crossbar switch fabric and the FIFO output buffer.

FIFO buffers 104(1) through 104(X) each output a corresponding signal with a data width of m(N) bits, where m is the speedup factor of the switch fabric. The output of each of FIFO buffers 104(1) through 104(X) is provided to the corresponding one of switch fabric input ports 105(1) through 105(X). The data width of switch fabric 102 is m(N) bits, and the corresponding data provided to each of FIFO buffers 106(1) through 106(Y) has a data width of m(N) bits. FIFO buffers 106(1) through 106(Y) provide output signals 108(1) through 108(Y), each with a data width of N. As described herein, FIFO buffers 104(1) through 104(X) and 106(1) through 106(Y) might be implemented using one-port memories. Embodiments of FIFO input buffers 104(1) through 104(X) are described with regard to FIGS. 2 and 3, and embodiments of FIFO output buffers 106(1) through 106(Y) are described with regard to FIGS. 4 and 5.

Figure 2:
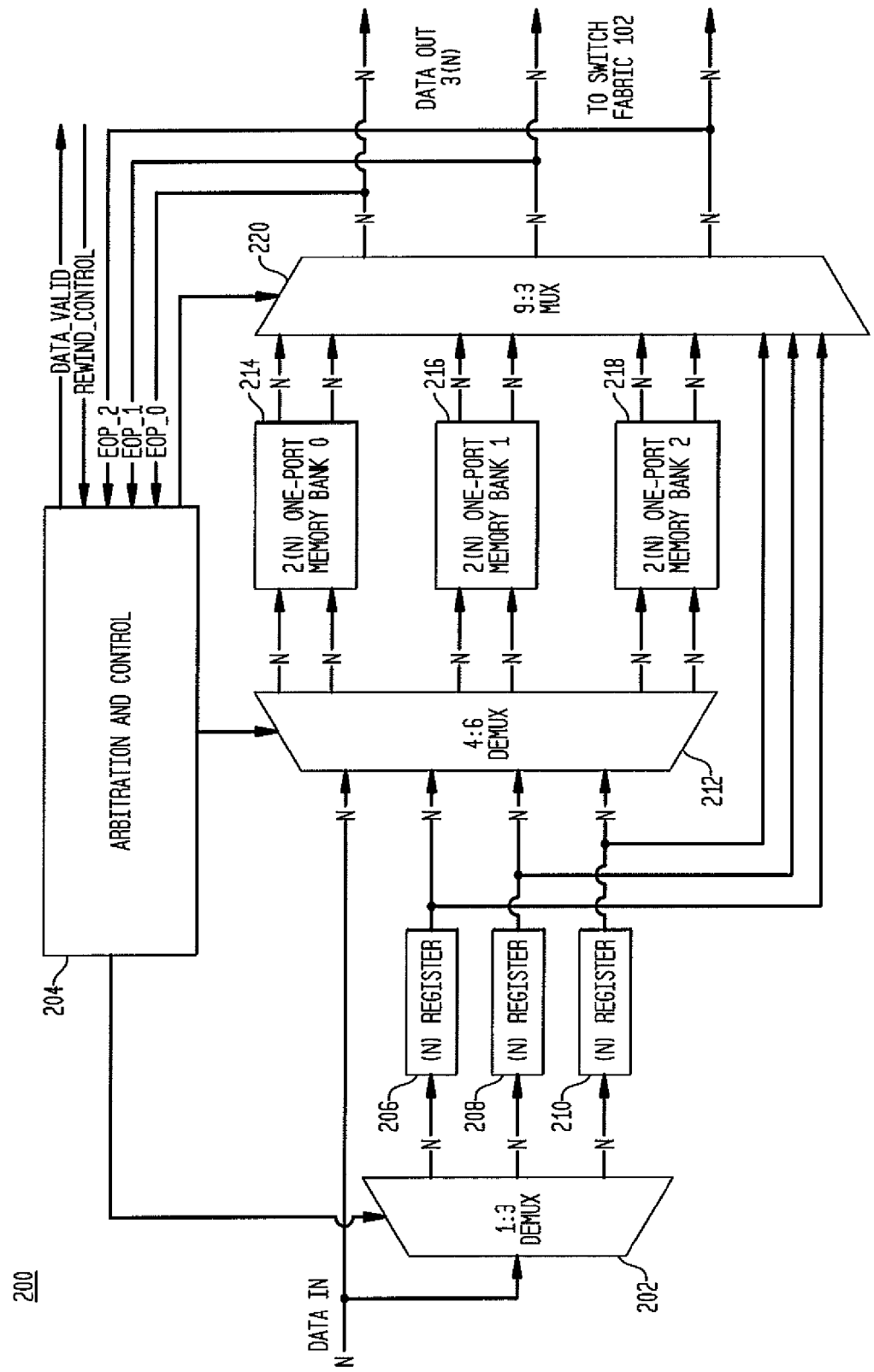
FIG. 2 shows a block diagram of a high speed packet input buffer in accordance with exemplary embodiments of the present invention.

FIG. 2 shows a block diagram of an embodiment of a FIFO input buffer employed by the switch system shown in FIG. 1. As shown, FIFO input buffer 200 employs m one-port memories with a data width of 2*(N), where m is the speedup factor of the switch fabric, and N is the data bus width. For example, as shown in FIG. 2, m is equal to three, as the embodiment of FIG. 2 employs three one-port memory banks 214, 216 and 218.

As shown in FIG. 2, the input data, of width N, is provided to 1:3 demultiplexer (demux) 202 and 4:6 Demux 212. Demux 202 selects which one of registers 206, 208 and 210 receives a given data word of width N. Registers 206, 208 and 210 might be employed as a write buffer to store up to 3 data words of width N. The write buffer might be employed to buffer one or more data words if the desired one of memory banks 214, 216 and 218 is busy processing a read operation. The output of registers 206, 208 and 210 is provided to Demux 212, and to 9:3 multiplexer (mux) 220. Demux 202 selects which data word of width N is provided to one of one-port memory banks 214, 216 and 218. Demux 202 and registers 206, 208 and 210 might be bypassed, for example if the desired one of memory banks 214, 216 and 218 is available to write data when a Data In data word is provided. By providing the output of registers 206, 208 and 210 to 9:3 Mux 220, one-port memory banks 214, 216 and 218 might be bypassed, for example, when the memory banks are empty, to reduce cut-through latency of a data packet provided to FIFO input buffer 200.

The six N-bit wide data outputs of Demux 212 are coupled to the data inputs of one-port memory banks 214, 216 and 218. As shown, each one-port memory bank 214, 216 and 218 has a data width of 2*(N), so each one-port memory bank 214, 216 and 218 could receive up to two N wide data words. Although shown as employing m one-port memories of width 2*N, the present invention is not so limited, as other numbers of one-port memories might be employed. For example, alternative embodiments might employ 2*m one-port memories of width N. In embodiments of the present invention one-port memory banks 214, 216 and 218 are pipelined memories with write-through disabled. Thus, the memory output is changed only when the memory is read, and the output remains constant when the memory is not read. This effectively employs the memory output as read storage, advantageously reducing the need to latch the read data with external logic circuitry and reducing system latency.

Arbitration and control module 204 generally controls the data flow through FIFO input buffer 200. For example, arbitration and control module 204 might control Demux 202, Demux 212, Mux 220 and read and write addressing of one-port memory banks 214, 216 and 218. In embodiments of the present invention, arbitration and control module 204 gives priority to read accesses of one-port memory banks 214, 216 and 218. Write accesses that are in conflict with a read access are staged in the write buffer (e.g., registers 206, 208 and 210). Arbitration and control module 204 might typically be set to wait for two data words to be available before writing to one of one-port memory banks 214, 216 and 218, thus advantageously utilizing the full 2*(N) data width of the memory. Consequently, a typical write operation might have at least one data word staged in the write buffer until a subsequent data word is provided as Data In.

As shown in FIG. 2, arbitration and control module 204 receives an input control signal, Rewind_Control, which is provided to arbitration and control module 204 from one or more control bits that might be included in the N-bit Data In. The Rewind_Control signal might be employed to indicate that a data packet should be retransmitted, for example in the case where a packet is multicast. As described herein, embodiments of the present invention provide a rewind function to retransmit a packet without latency. As will be described with regard to FIGS. 6-13, when the end of the data packet is output from the FIFO buffer, the FIFO is configured to "rewind" to the start of the data packet.

Arbitration and control module 204 outputs control signal Data_Valid. In a switch system having speedup, data at the FIFO output is not always valid each clock cycle since the FIFO output is m times wider than the input data. Also, with speedup of m, the length of packets stored in the FIFO is not necessarily equal to a multiple of m*N long. Thus, in some cases, the FIFO output might include partially valid and partially invalid data, where not all m*N data bits are valid. Control signal Data_Valid might be employed to indicate whether Data Out includes valid data, invalid data, or some combination of valid and invalid data.

Arbitration and control module 204 might typically allow a maximum number of consecutive read operations of one-port memory banks 214, 216 and 218, which allows the number of registers of the write buffer (e.g., registers 206, 208 and 210) to be limited. For example, as shown in FIG. 2, arbitration and control module 204 might allow a maximum of two consecutive read operations of one-port memory banks 214, 216 and 218. For example, the maximum of two consecutive read operations might occur when a packet is retransmitted, such as for packet multicast. Allowing a maximum of two consecutive read operations allows the number of registers to be limited to three (e.g., registers 206, 208 and 210) since two data words are written to the memories at a time and at most two consecutive read operations can be processed. In other words, each of one-port memory banks 214, 216 and 218 is available to process a write operation at least one of every three clock cycles, since arbitration and control module 204 limits memory banks 214, 216 and 218 to two consecutive read operations. Arbitration and control module 204 might generally provide that incoming data packets are written to memory banks 214, 216 and 218 in descending order, meaning that Bank 0 (memory bank 214) is written first, and Bank 2 (memory bank 218) is written last, before returning to Bank 0 (214).

As shown in FIG. 2, Mux 220 selects which ones of the outputs of one-port memory banks 214, 216 and 218 are provided as the output of FIFO input buffer 200. Mux 220 provides an output data bus having a data width of m*(N), which includes m data words of width N. As shown in FIG. 2, m is equal to 3. Each N-bit wide output might include one or more control bits. For example, the control bits might include an end-of-packet (EOP) bit that is provided to Arbitration and Control module 204 (shown as signals EOP_0, EOP_1 and EOP_2). In embodiments of the present invention, the control bits provided to arbitration and control module 204 might be removed from the output signal, Data Out. In such a case, the output signal, Data Out, might be of width 3*(N−1). If the control bits are included in the output signal, Data Out might be of width 3*(N). Data Out is provided to switch fabric 102. For the embodiment shown in FIG. 2, the start of a data packet might occur at any N-bit boundary.

Figure 3:
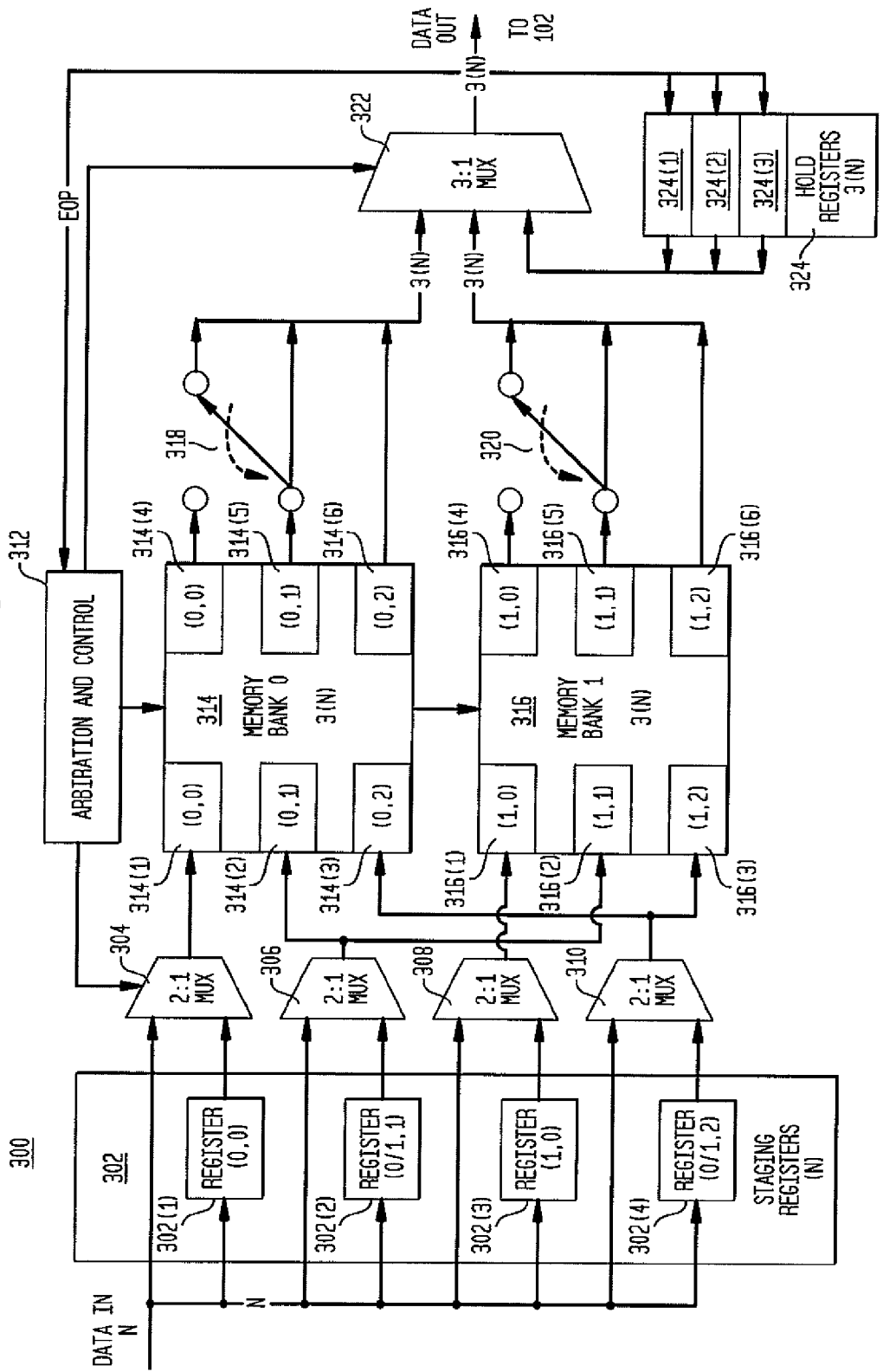
FIG. 3 shows a block diagram of another high speed packet input buffer in accordance with exemplary embodiments of the present invention.

FIG. 3 shows another exemplary embodiment of a FIFO input buffer, 300. As shown in FIG. 3, the start of a data packet might occur at any m*N boundary, except for the case of consecutive packets of length N. In a similar manner to that described for FIFO input buffer 200 of FIG. 2, FIFO input buffer 300 receives Data In of width N, which might include control bits to indicate various control data. For example, the control bits might indicate that a particular data word is the end of a packet. FIFO input buffer 300 employs two one-port memory banks (314 and 316) of width m*(N), where m is the speedup factor of the switch fabric, and N is the data bus width. For example, as shown in FIG. 3, m is equal to three, and memory banks 314 and 316 each can receive 3 data words of width N. Memory banks 314 and 316 are one-port memories and are pipelined, meaning that memory banks 314 and 316 are implemented with flip-flop inputs and outputs.

Data In, of width N, is provided to staging register 302. As shown, staging register 302 includes four registers, 302(1) through 302(4). Each register 302(1) through 302(4) holds a data word of width N. The output of each register 302(1) through 302(4) is provided to a corresponding 2:1 multiplexer, shown as muxes 304, 306, 308 and 310. While FIG. 3 shows multiplexers, one skilled in the art could implement muxes 304, 306, 308 and 310 with other logic modules. The other input to each mux 304, 306, 308 and 310 is the current data word present at Data In. Thus, in operation, muxes 304, 306, 308 and 310 might bypass the staging registers 302(1) through 302(4) and select the current data word of Data In.

As shown in FIG. 3, write requests are maskable at an N-bit boundary. For example, each memory bank 314 and 316 has three independent write bit masks to allow independent writing of data words, offset at N-bit boundaries. Muxes 304, 306, 308 and 310 are employed to select which data word, either from Data In or from one of registers 302(1) through 302(4), is provided to a corresponding input port of one of memory banks 314 and 316. As shown in FIG. 3, register 302(1) and mux 304 correspond to word 0 of the input to memory bank 314; register 302(2) and mux 306 correspond to word 1 of both memory bank 314 and memory bank 316; register 302(3) and mux 308 correspond to word 0 of memory bank 316; and register 302(4) and mux 310 correspond to word 2 of both memory bank 314 and memory bank 316. As shown, each memory bank 314 and 316 can retrieve 3 data words at their respective input ports. The data words are shown as data words 314(1), 314(2) and 314(3) for memory bank 314, and data words 316(1), 316(2) and 316(3) for memory bank 316. Data In words that are unable to be written into a memory bank because the memory bank port is busy serving a read request are buffered in one of staging registers 302(1) through 302(4). As shown, the four registers 302(1) through 302(4) serve the six possible write word locations: data words 314(1), 314(2) and 314(3) for memory bank 314, and data words 316(1), 316(2) and 316(3) for memory bank 316. Although shown employing four registers, other embodiments might employ other numbers of registers.

The read data port of each memory bank 314 and 316 is 3*(N) bits wide. Thus, the output of memory banks 314 and 316 might include 3 data words of width N. The output words are shown as data words 314(4), 314(5) and 314(6) for memory bank 314, and data words 316(4), 316(5) and 316(6) for memory bank 316. As described herein, the output port of memory banks 314 and 316 might include flip-flops with a write-through disabled, as will be described with regard to FIGS. 6 through 14. The data-hold control of the output flip-flops might allow the input port to be freed to process a write request.

Output data words 314(4) and 314(5) are provided to switch 318. As shown, based on the configuration of switch 318, output data words 314(4), 314(5) and 314(6) generally are provided to mux 322 as a 3*(N) wide data bus. Similarly, output data words 316(4) and 316(5) are provided to switch 320. As shown, based on the configuration of switch 320, output data words 316(4), 316(5) and 316(6) generally are provided to mux 322 as a 3*(N) wide data bus.

Mux 322 selects which of memory bank 314, memory bank 316 and External Hold Register 324 outputs are provided as the output of FIFO input buffer 300. Similarly as described with regard to FIG. 2, the output data might include one or more control bits, such as an end of packet (EOP) control bit that is provided to arbitration and control module 312. Data Out, having a width of 3*(N), is provided to switch fabric 102. Alternatively, the control bits might be removed from the output, and Data Out might have a width of 3*(N−1). External Hold Register 324 is coupled to the output of mux 322 and feeds back to the third input of mux 322. External Hold Register 324 includes three N-bit wide registers, shown as 324(1) through 324(3). Generally, External Hold Register 324 might act as a cache for the first three data words (e.g., the first 3*(N) bits) of a data packet. As will be described with regard to FIGS. 6 through 14, External Hold Register 324 might be advantageously employed during retransmission of a data packet and to align the first word of a packet to a 3*(N) boundary.

Similarly as described with regard to FIG. 2, arbitration and control module 312 generally controls muxes 304, 306, 308, 310 and 322, switches 318 and 320, and read and write accesses of memory banks 314 and 316. Arbitration and control module 312 might limit the maximum number of consecutive reads from different addresses of memory banks 314 and 316, which limits the maximum number of clock cycles a write request has to wait. In embodiments of the present invention, the maximum number of consecutive reads (each taking one clock cycle) is 2, and, thus, a write request could be staged for a maximum of 2 clock cycles. Further, arbitration and control module 312 might allow at most one of memory banks 314 and 316 to be in "read mode" in any cycle (for example, read request processing might ping-pong between memory banks 314 and 316). The maximum of two consecutive reads from different addresses in the same memory bank might occur, for example, when the start and end of a packet being retransmitted are stored in the same memory bank. An exemplary data flow through FIFO input buffer 300 will be described with regard to FIGS. 6 through 14.

Figure 4:
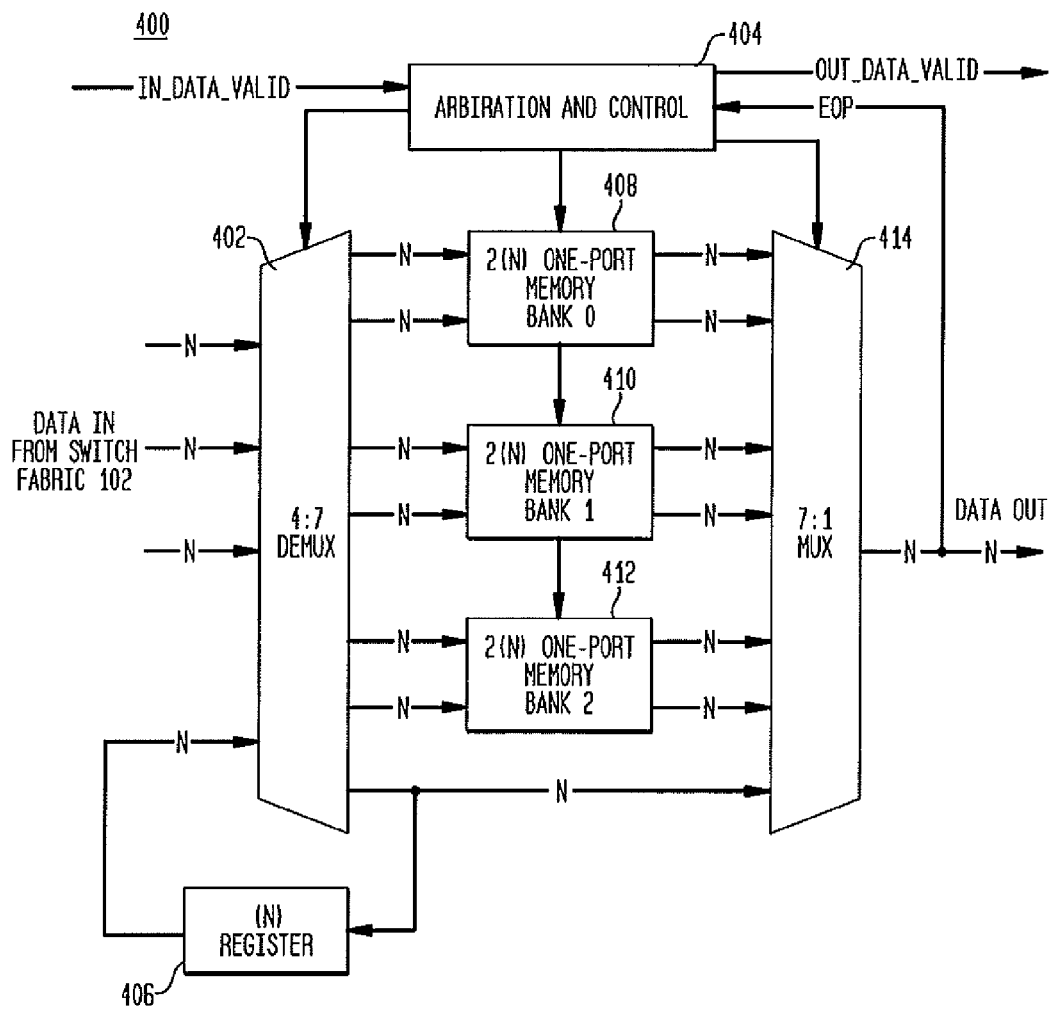
FIG. 4 shows a high speed packet output buffer in accordance with exemplary embodiments of the present invention.

FIG. 4 shows a block diagram of an embodiment of a FIFO output buffer employed by the switch system shown in FIG. 1. As shown, FIFO input buffer 400 employs m single port memories with a data width of 2*(N), where m is the speedup factor of the switch fabric, and N is the data bus width. For example, as shown in FIG. 4, m is equal to three, as the embodiment of FIG. 4 employs three one-port memory banks 408, 410 and 412. Data In is provided from switch fabric 102, and has width N, as described with regard to FIG. 2. Each data word might have a width of N, and include one or more control bits to indicate that a particular data word is the end of a packet.

As shown in FIG. 4, the input data, of width N, is provided to 4:7 Demux 402. Demux 402 selects which one of the 3*(N) data words is routed to which input word of memory banks 408, 410 and 412. Demux 402 might also select the contents of register 406 as its input. Register 406 is coupled to one of the outputs of Demux 402. Register 406 might be employed as a write buffer to store a data word of width (N). The write buffer might be employed to buffer a data word to align write operations to the 2*N width of the desired one of memory banks 408, 410 and 412. Since register 406 is coupled to an input of Demux 402, an N data word might be stored in register 406, and Demux 402 might select the stored data word to write to one of memory banks 408, 410 and 412. This output of Demux 402 is provided to 7:1 Mux 414. Thus, one-port memory bank 408, 410 and 412 might be bypassed, for example, when the memories are empty, to reduce cut-through latency of a data packet provided to FIFO output buffer 400.

Six of the N wide data outputs of Demux 402 are coupled to the data inputs of one-port memory banks 408, 410 and 412. As shown, each one-port memory 408, 410 and 412 has a data width of 2*(N), so each one-port memory 408, 410 and 412 could receive up to two N wide data words. In embodiments of the present invention, one-port memory banks 214, 216 and 218 are pipelined memories with write-through disabled. Thus, the memory output is changed only when the memory is read, and the output remains constant when the memory is not read. Memory output is thus employed as read storage, advantageously reducing the need to latch the read data with external logic circuitry and reduce system latency.

Arbitration and control module 404 generally controls the data flow through FIFO output buffer 400. For example, arbitration and control module 404 might control Demux 402, Mux 414 and read and write addressing of one-port memory banks 408, 410 and 412. In embodiments of the present invention, arbitration and control module 404 gives priority to write accesses of one-port memory banks 408, 410 and 412. Read access conflicts with write accesses are avoided by performing pre-fetch of the next data word(s) to be read whenever there is data in the memory and no write accesses are being processed. Embodiments of the present invention might allow a 4 clock cycle window to prefetch the next data. For example, when data is removed from FIFO output buffer 400, each memory bank (e.g., each of memory banks 408, 410 and 412) prefetches the next read data in a 4 cycle window to avoid read/write conflicts. By prefetching data, the need for FIFO extension might be eliminated. As described herein, packets are generally stored consecutively in the memory banks. For example, a given first memory bank cannot fetch new data before the current data is sent to the output. Once the data is sent to the output, in the same clock cycle, the memory bank can fetch new data. In described embodiments, it might take at least 4 clock cycles to send data from the other two memory banks to output before the data from the first memory bank is needed again. Arbitration and control module 404 might thus make the memory banks available for read operations for approximately one out of every two clock cycles. Register 406 is employed to group data for writing to either one memory bank, or two memory banks simultaneously. Since the incoming data arrives at a rate of at most of 3*N, and the memory width is 6*N, the memory will be written at most half of the time.

Similarly as shown in FIG. 2, arbitration and control module 404 receives an input control signal, In_Data_Valid, which is provided to arbitration and control module 404. Control signal In_Data_Valid might be employed to indicate whether Data In includes valid data, invalid data, or some combination of valid and invalid data. Control signal Out_Data_Valid might be employed to indicate whether Data Out includes valid data, invalid data, or some combination of valid and invalid data.

Arbitration and control module 404 might generally provide that incoming data packets are written to memory banks 408, 410 and 412 in descending order, meaning that memory bank 0 (408) is written first, and memory bank 2 (412) is written last, before writing again to bank 0 (408). As shown in FIG. 4, Mux 414 selects which one of the outputs of one-port memory banks 408, 410 and 412 is provided as the output of FIFO output buffer 400. Mux 414 provides an output data bus having a data width of (N). The N wide output might include one or more control bits, for example an end-of-packet (EOP) bit, provided to arbitration and control module 404. The output signal, Data Out, might not include the EOP control bit. For example, the output signal, Data Out, might be one-bit narrower than Data In. For example, if Data In is of width (N−1), Data Out is of width (N−2). Data Out is provided to a destination device (not shown). Thus, embodiments of the present invention employing FIFO input buffer 200 and FIFO output buffer 400 provide a switch fabric speedup factor of m by employing m one-port memory banks in each buffer, with each memory having a width approximately equal to twice the width, N, of the data bus.

Figure 5:
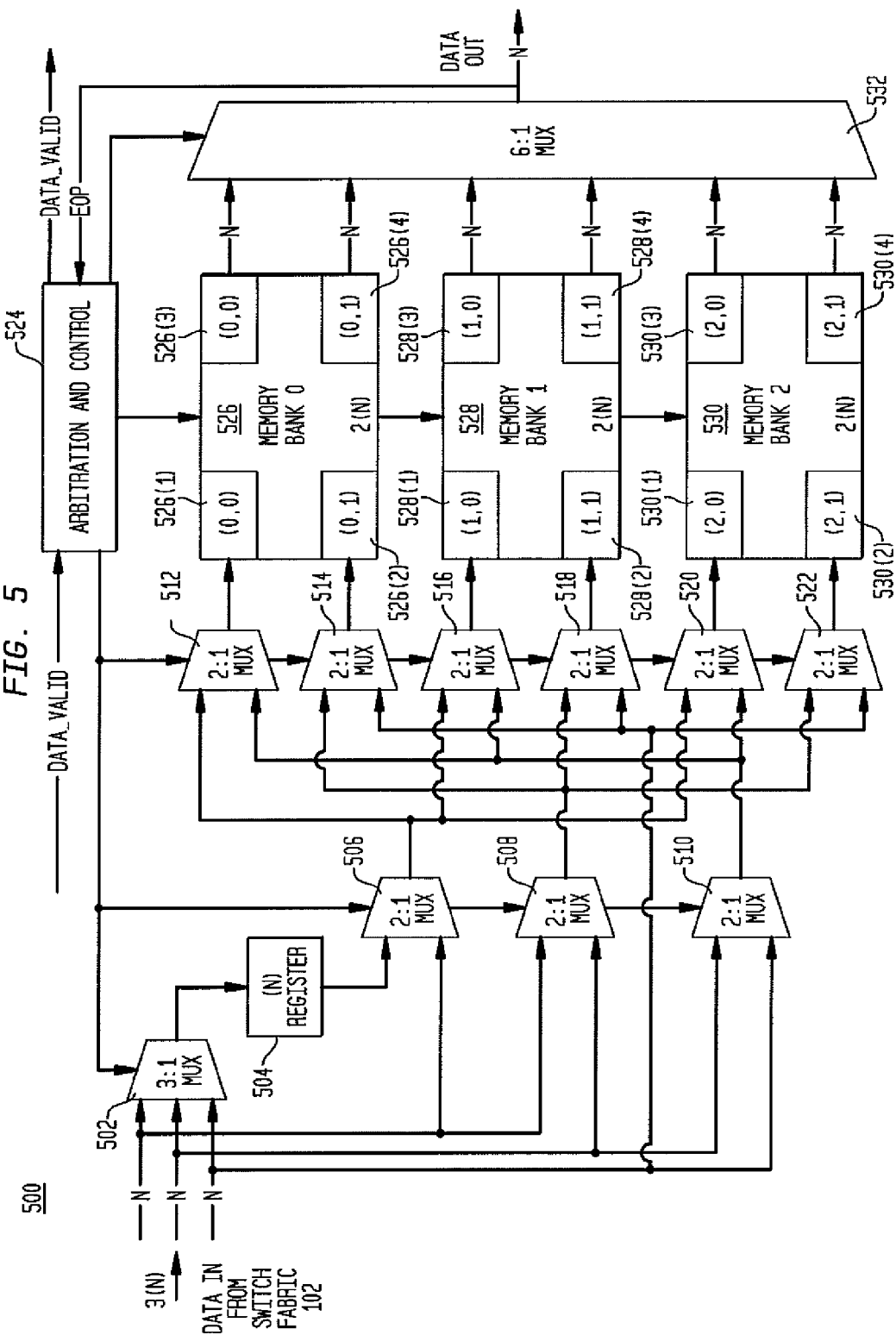
FIG. 5 shows a block diagram of another high speed packet input buffer in accordance with exemplary embodiments of the present invention.

FIG. 5 shows an alternative exemplary embodiment of FIFO output buffer. As shown in FIG. 5, FIFO output buffer 500 receives Data In from switch fabric 102. Data In has width 3*(N). Each of the three data words of width N are provided to mux 502. The output of mux 502 is provided to register 504. Register 504 might be employed to stage an incoming data word to align write requests to a corresponding one of memory banks 526, 528 and 530. Each memory bank 526, 528 and 530 is of width 2*(N). Thus, as shown in FIG. 5, FIFO output buffer 500 employs m one-port memory banks (526, 528 and 530) of width 2*(N), where m is the speedup factor of the switch fabric, and N is the data bus width. For example, as shown in FIG. 5, m is equal to three. Memory banks 526, 528 and 530 each can receive 2 data words of width N. Memory banks 526, 528 and 530 are one-port memories and are pipelined, meaning that memory banks 526, 528 and 530 are implemented with flip-flop inputs and outputs.

Data In, which includes three data words of width N, is provided to muxes 506, 508 and 510. As shown, a first data word is provided to muxes 506 and 508, a second data word is provided to muxes 508 and 510, and a third data word is provided to mux 510. The third data word is also provided to muxes 514, 518 and 522. Mux 506 also receives the output of register 504. The output of mux 506 is provided to muxes 512, 516 and 520. The output of mux 508 is provided to muxes 514, 518 and 522. The output of mux 510 is provided to 512, 516 and 520. The output of mux 512 is provided to input word 0 of memory bank 526, shown as input word 526(1).

As shown in FIG. 5, write requests are maskable at an N-bit boundary. For example, each memory bank 526, 528 and 530 has two independent write bit masks to allow data words, offset at N boundaries, to be written independently. Muxes 502 and 506-522 are employed to select which data word, either from Data In or from register 504, is provided to a corresponding word offset of the input port of one of memory banks 526, 528 and 530. The output of mux 514 is provided to input word 1 of memory bank 526, shown as input word 526(2). The output of mux 516 is provided to input word 0 of memory bank 528, shown as input word 528(1). The output of mux 518 is provided to input word 1 of memory bank 528, shown as input word 528(2). The output of mux 520 is provided to input word 0 of memory bank 530, shown as input word 530(1). The output of mux 522 is provided to input word 1 of memory bank 530, shown as input word 530(2). Thus, as shown in FIG. 5, the first data word of each memory bank (e.g., 526(1), 528(1) and 530(1)) might receive a data word from register 504, or any one of the first, second or third data words from Data In. The second data word of each memory bank (e.g., 526(2), 528(2) and 530(2)) might receive a data word from any one of the first, second or third data words from Data In.

The output of memory banks 526, 528 and 530 might also include 2 data words of width N. The output words are shown as data words 526(3), 526(4), 528(3), 528(4), 530(3) and 530(4). As described herein, the output port of memory banks 526, 528 and 530 might include flip-flops with write-through disabled. The write-through control of the output flip-flops might allow the input port to be freed to process a write request.

Output data words 526(3), 526(4), 528(3), 528(4), 530(3) and 530(4) are provided to mux 532 as N wide data. Mux 532 selects which of memory banks 526, 528 and 530 outputs are provided as the output of FIFO input buffer 300. Similarly as described with regard to FIG. 4, the output data might include one or more control bits, such as an end of packet (EOP) control bit that is provided to arbitration and control module 524. The control bits might be removed from the output signal, such as described with regard to FIG. 4. Data Out, having a width of N, is provided as the output of switch system 100. Similarly as described with regard to FIG. 4, arbitration and control module 524 generally controls muxes 304, 306, 308, 310 and 322, and read and write accesses of memory banks 526, 528 and 530.

Thus, embodiments of the present invention employing FIFO input buffer 300 and FIFO output buffer 500 provide a switch fabric speedup factor of m by employing m one-port memory banks in each output buffer, with each memory having a width approximately equal to twice the width, N, of the data bus. Each input buffer might employ two one-port memory banks, with each memory having a width approximately equal to m times the width, N, of the data bus.

FIGS. 6 through 13 show an exemplary data flow through FIFO input buffer 300. As described with regard to FIG. 3, in normal operation, read request processing might ping-pong between the two memory banks 314 and 316 and the read pointer keeps advancing to the next read address. Write requests are processed whenever input data is present and the write port is available. If the write port is unavailable, data is stored in Staging Register 302 until the write port becomes available. An exemplary normal operation data flow is shown in FIGS. 6-10.

As shown in FIGS. 6-13, read packet $P_R$ is the $R^{th}$ packet in a data stream being read from memory banks 314 and 316, and $P_R(i)$ is the $i^{th}$ N-bit data word of read packet $P_R$. Similarly, write packet $P_W$ is the $W^{th}$ packet in a data stream being written to memory banks 314 and 316, and $P_W(i)$ is the $i^{th}$ N-bit data word of write packet $P_W$.

Figure 6:
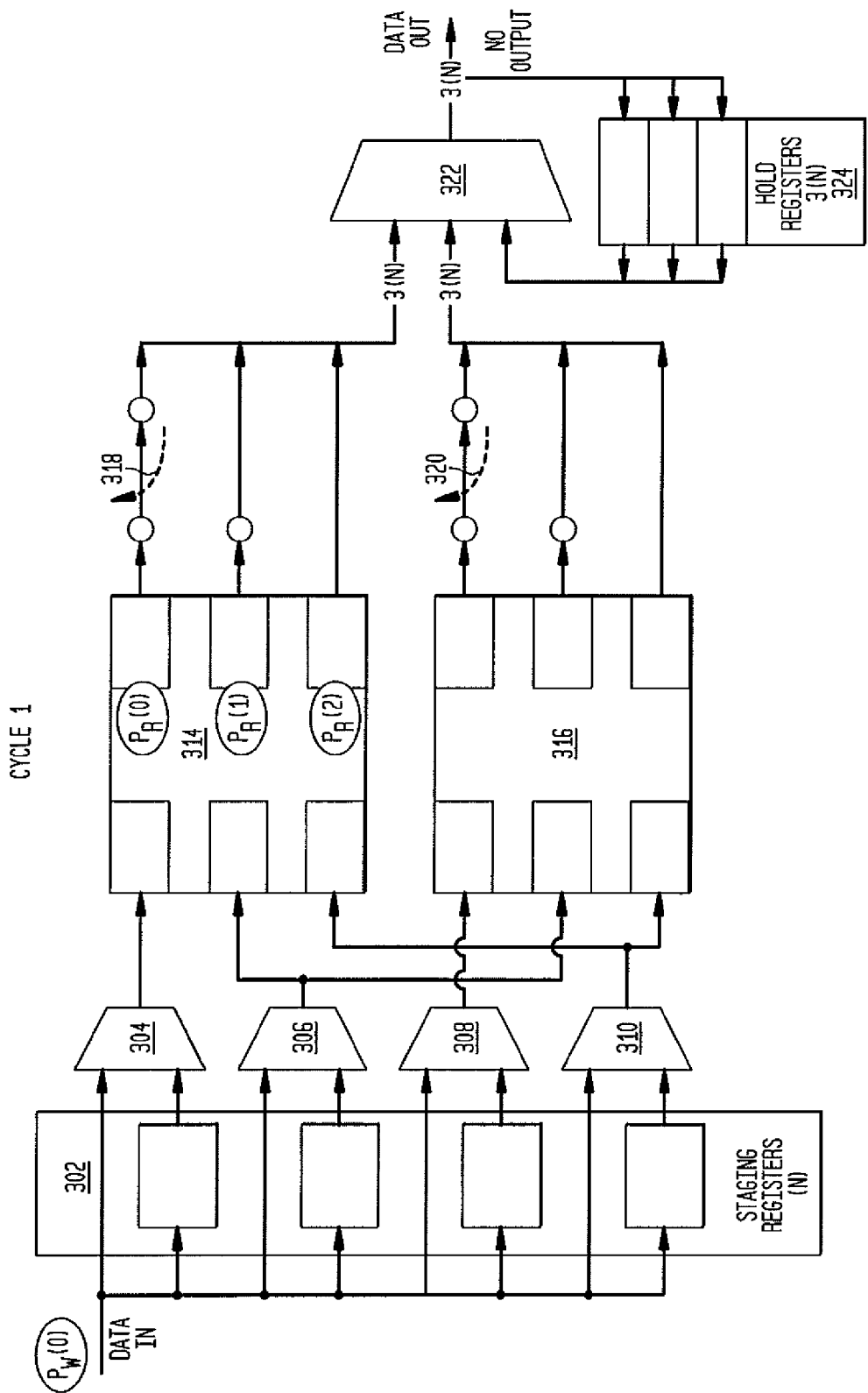
FIGS. 6 through 13 show an exemplary data flow through the input buffer shown in FIG. 3.

As shown in FIG. 6, at a first clock cycle, memory bank 314 reads the head of read packet $P_R$, data words $P_R(0)$, $P_R(1)$ and $P_R(2)$, from the memory address provided by arbitration and control module 312 (not shown in FIG. 6). When data words $P_R(0)$, $P_R(1)$ and $P_R(2)$ are read from memory, they are will be latched into port register data word offsets 314(4), 314(5) and 314(6), as shown, at the start of the next clock cycle. Also during the first clock cycle, the first word of a write packet, $P_W(0)$, arrives on the Data In input. Memory bank 316 is idle since memory bank 314 is in read mode and write data is not available to be written. Invalid output data is present at Data Out.

Figure 7:
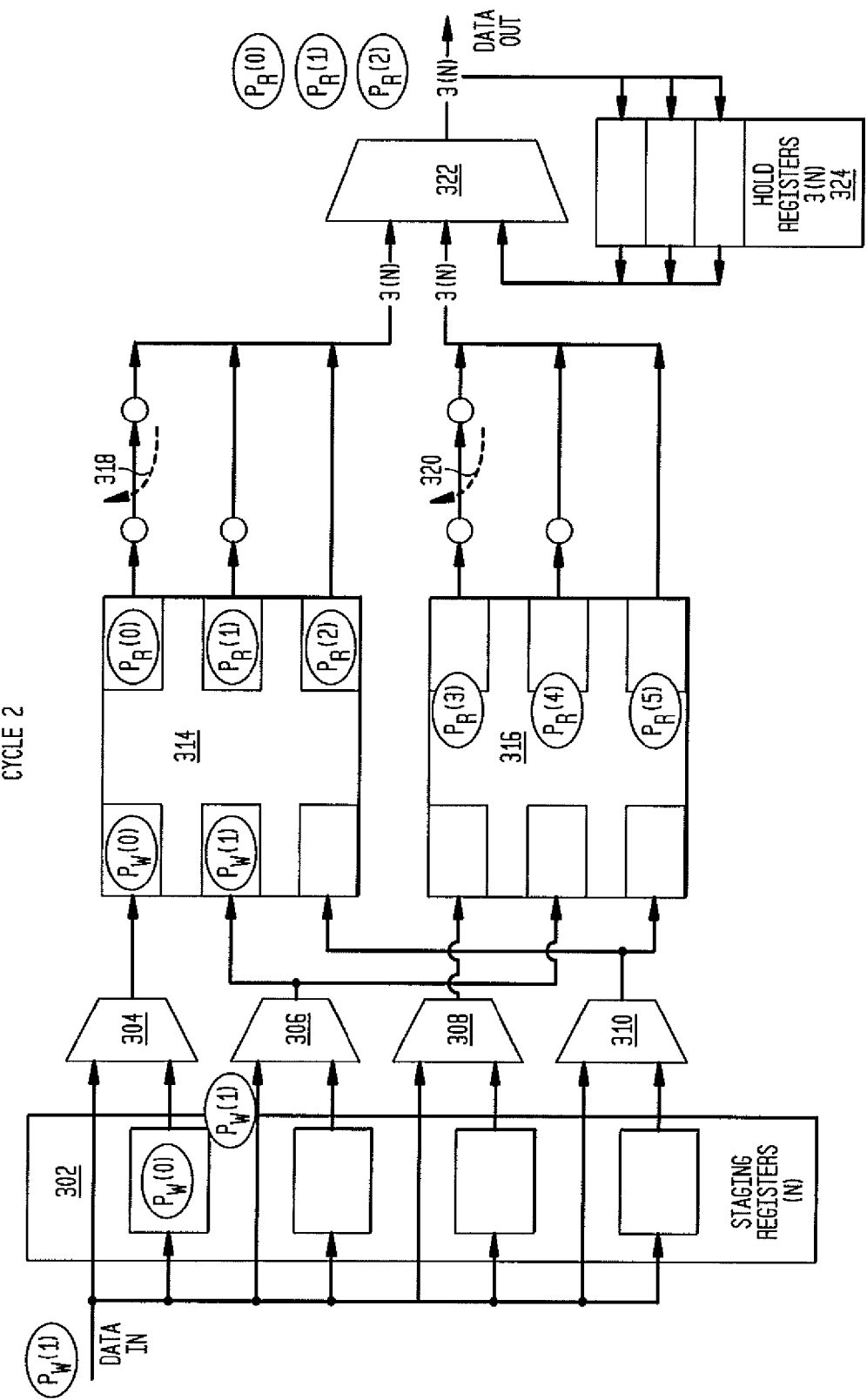

FIG. 7 shows the data flow of FIFO input buffer 300 at a second clock cycle. Data words $P_R(0)$, $P_R(1)$ and $P_R(2)$, read from memory during the first clock cycle, are in the corresponding word offsets of the output port (e.g., 314(4), 314(5) and 314(6)). As shown, data word $P_W(0)$, which arrived during the first clock cycle, has been stored in staging register 302, and a next word of the write packet, $P_W(1)$, is at Data In. Since the port of memory bank 314 is available to process a write request, data words $P_W(0)$ and $P_W(1)$ are written to memory bank 314. Thus, mux 304 is set to select $P_W(0)$ from staging register 302(1), and $P_W(0)$ is written to input word offset 314(1). Mux 306 is set to select $P_W(1)$ to bypass staging register 302(2), and $P_W(1)$ is written to input word offset 314(2). Memory bank 316 reads the next three data words of the read packet, $P_R(3)$, $P_R(4)$ and $P_R(5)$ from memory. Mux 322 is set to select the output of memory bank 314, and data words $P_R(0)$, $P_R(1)$ and $P_R(2)$, read from memory during the first clock cycle, are provided from the output port of memory 314 to Data Out.

Figure 8:
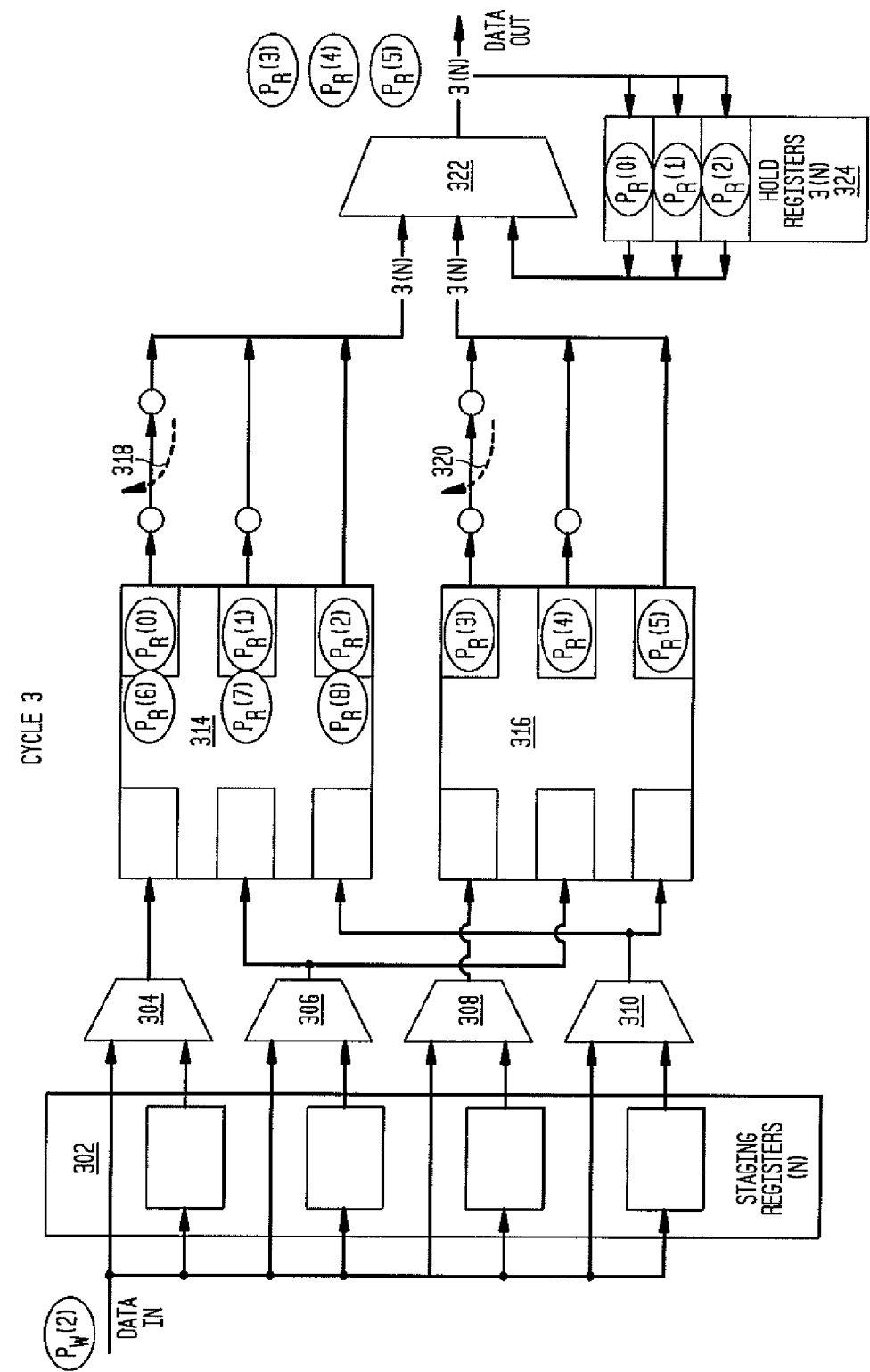

FIG. 8 shows the data flow of FIFO input buffer 300 at a third clock cycle. Mux 322 is set to select the output of memory bank 316, and data words $P_R(3)$, $P_R(4)$ and $P_R(5)$ are provided from the output port of memory 316 to Data Out. Data words $P_R(0)$, $P_R(1)$ and $P_R(2)$, the head of the read packet, are cached in hold register 324. Memory bank 314 reads the next three data words of the packet, $P_R(6)$, $P_R(7)$ and $P_R(8)$ from memory. Since memory bank 314 is not being read during this clock cycle, the output data words $P_R(0)$, $P_R(1)$ and $P_R(2)$ might still be stored in the corresponding word offsets of the output port (e.g., 314(4), 314(5) and 314(6)), depending on the setting of the output flip-flops write-enable (data-hold) signal. A next word of the write packet, $P_W(2)$, arrives at Data In. Data words $P_R(3)$, $P_R(4)$ and $P_R(5)$, read from memory during the second clock cycle, are in the corresponding word offsets of the output port (e.g., 316(4), 316(5) and 316(6)).

Figure 9:
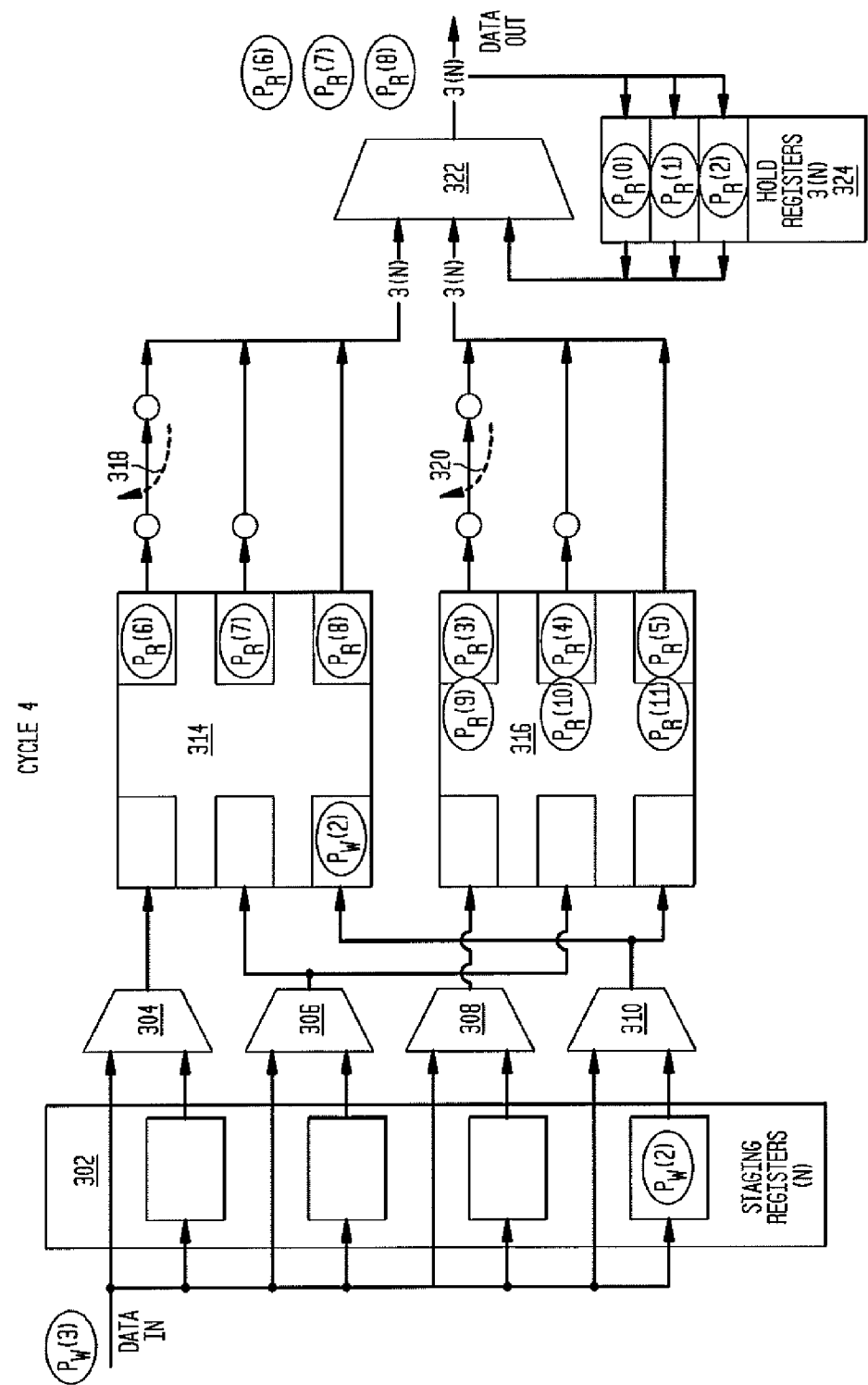

FIG. 9 shows the data flow of FIFO input buffer 300 at a fourth clock cycle. Mux 322 is set to select the output of memory bank 314, and data words $P_R(6)$, $P_R(7)$ and $P_R(8)$ are provided from the output port of memory 314 to Data Out. In embodiments of the present invention, data words $P_R(3)$, $P_R(4)$ and $P_R(5)$ might still be stored in the corresponding word offsets of the output port (e.g., 316(4), 316(5) and 316(6)), depending on the setting of the output flip-flops write-enable (data-hold) signal. Data words $P_R(0)$, $P_R(1)$ and $P_R(2)$, the head of the read packet, remain cached in hold register 324. Data words $P_R(6)$, $P_R(7)$ and $P_R(8)$ are in the corresponding word offsets of the output port (e.g., 314(4), 314(5) and 314(6)). Write packet data word $P_W(2)$ is stored in staging register 302. Mux 310 is set to select staging register 302(4) to provide data word $P_W(2)$ to input word offset 314(3) of memory bank 314. A next word of the write packet, $P_W(3)$, arrives at Data In. Memory bank 316 reads the next three data words of the read packet, $P_R(9)$, $P_R(10)$ and $P_R(11)$.

Figure 10:
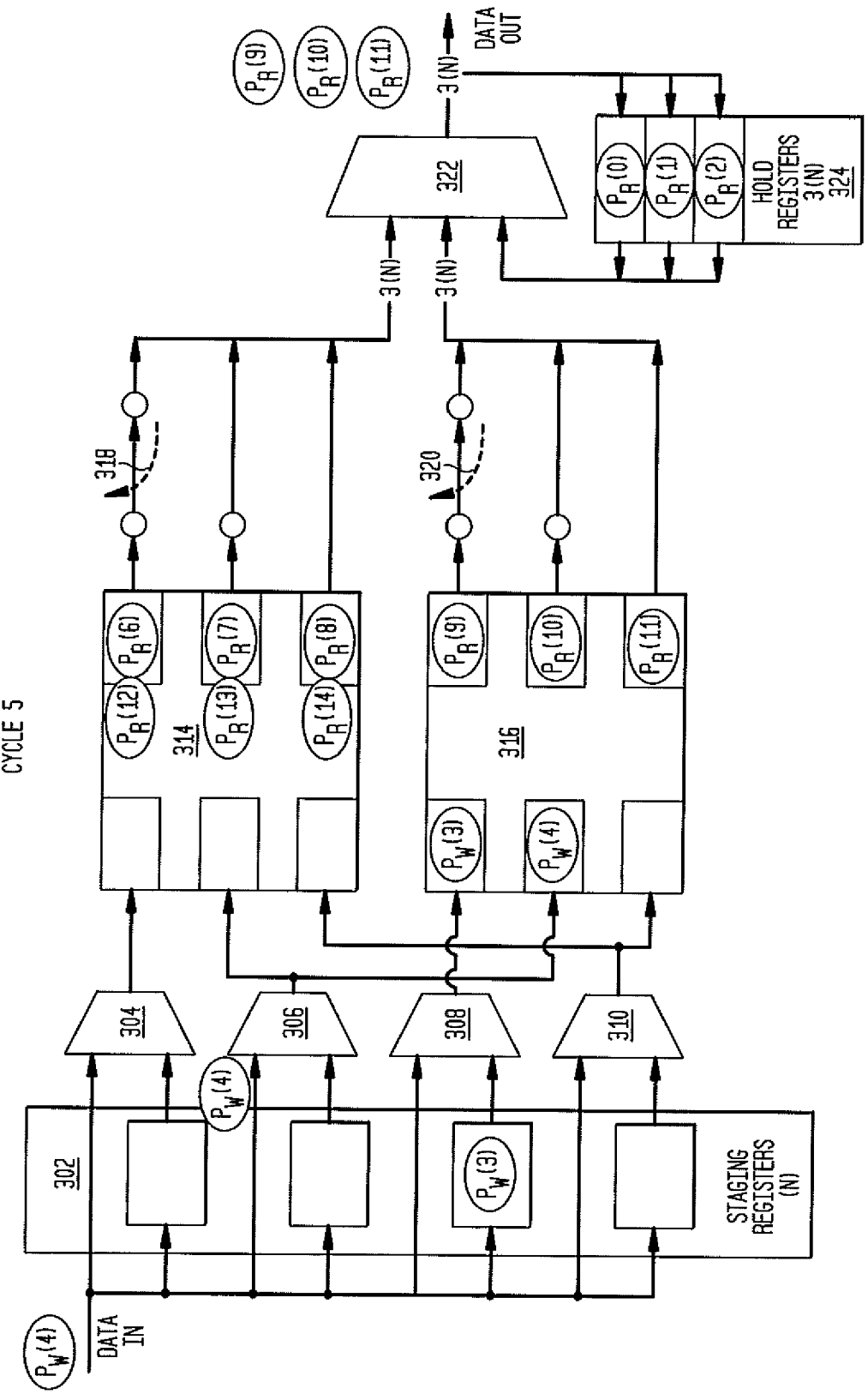

FIG. 10 shows the data flow of FIFO input buffer 300 at a fifth clock cycle. Mux 322 is set to select the output of memory bank 316, and data words $P_R(9)$, $P_R(10)$ and $P_R(11)$ are provided from the output port of memory 316 to Data Out. Data words $P_R(0)$, $P_R(1)$ and $P_R(2)$, the head of the read packet, remain cached in hold register 324. Memory bank 314 reads the next three data words of the packet, $P_R(12)$, $P_R(13)$ and $P_R(14)$. Write packet data word $P_W(3)$ is stored in staging register 302. Mux 308 is set to select staging register 302(3) to provide data word $P_W(3)$ to word offset 316(1) of memory bank 316. Mux 306 is set to select $P_W(4)$ to bypass staging register 302(2), and $P_W(4)$ is written to word offset 316(2). Data words $P_R(9)$, $P_R(10)$ and $P_R(11)$ are in the corresponding word offsets of the output port (e.g., 316(4), 316(5) and 316(6)).

Figure 11:
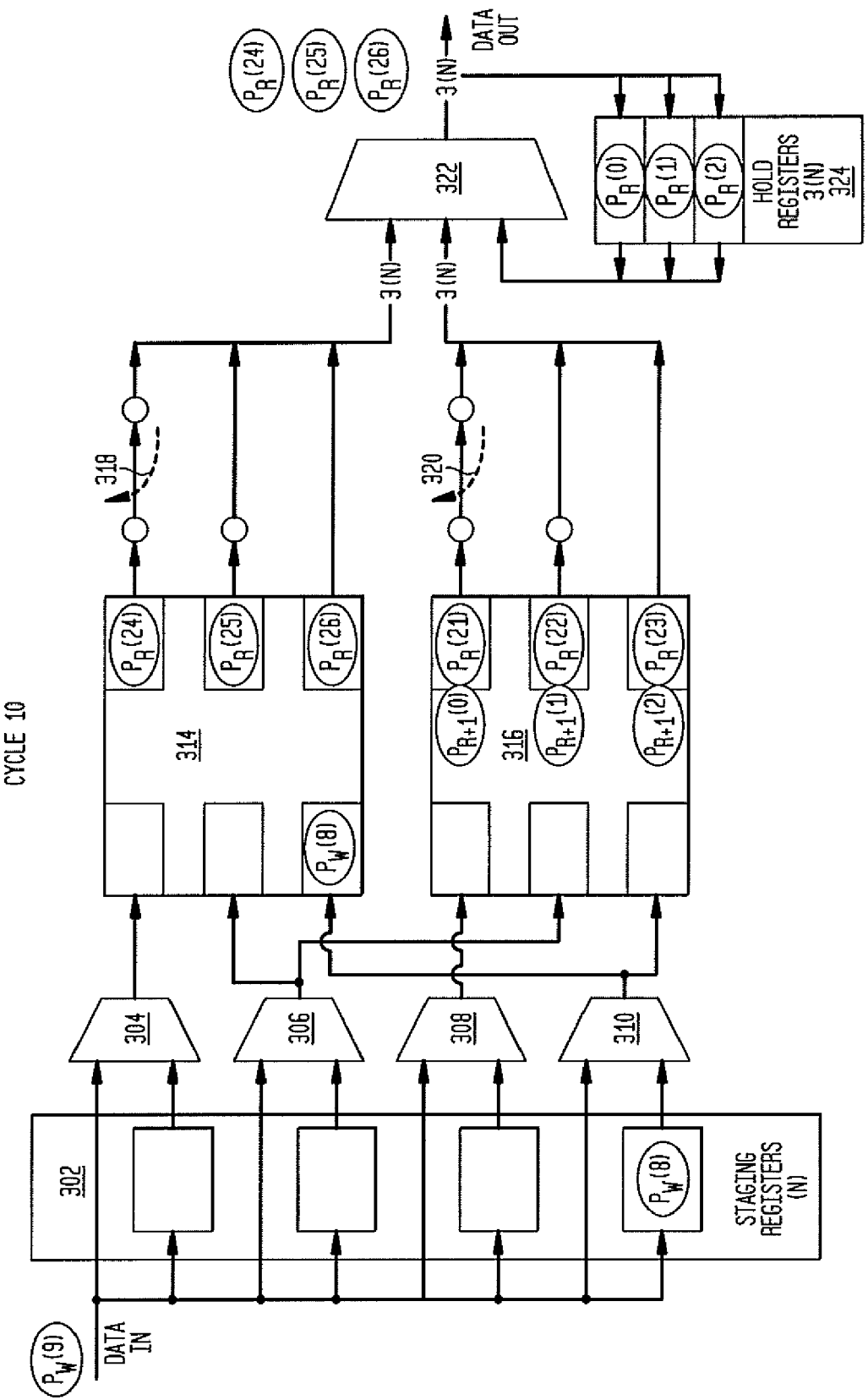
Figure 12:
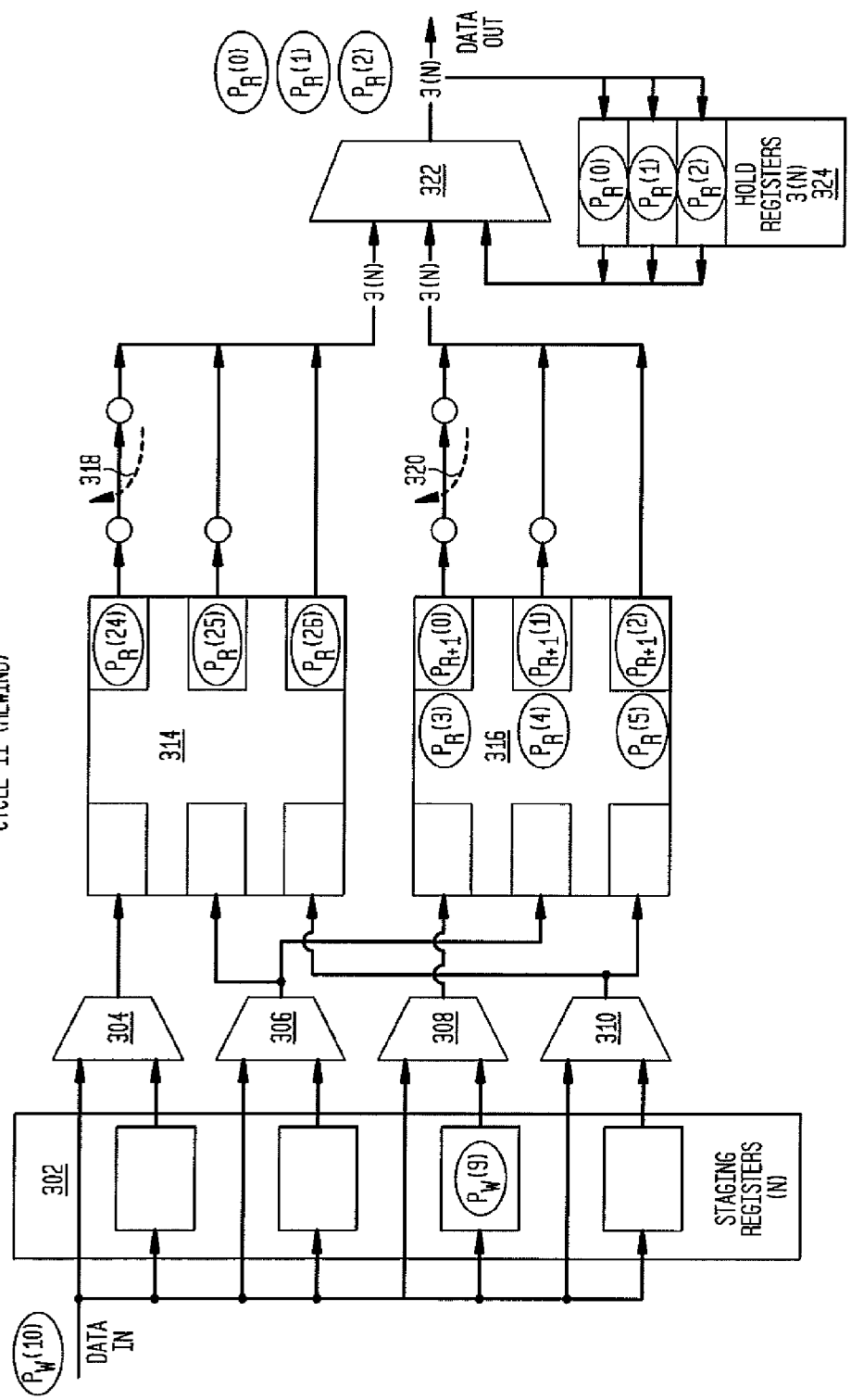
Figure 13:
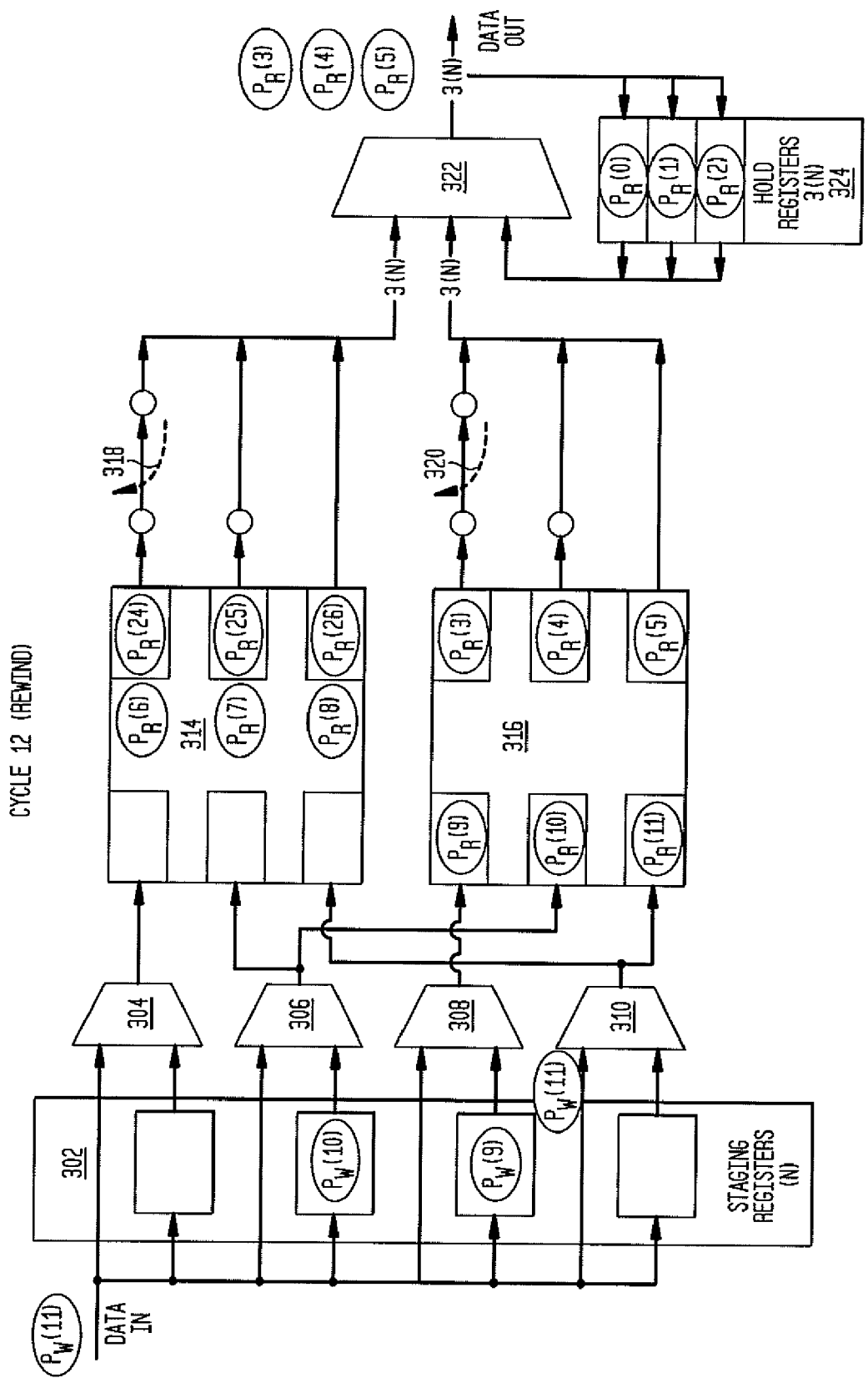

FIGS. 11-13 show an exemplary data flow through FIFO input buffer 300 for the special case of packet retransmission. When a packet is retransmitted, if the head and tail words of the packet are both in same Memory Bank, ping-pong reading is not possible. In the exemplary data flow shown in FIGS. 11-14, the head and tail words of the packet are shown to both be stored in memory bank 314. As described with regard to FIG. 8, the head of read packet $P_R$, data words $P_R(0)$, $P_R(1)$ and $P_R(2)$, are cached in External Holding Register 324 to reduce retransmission latency.

Switches 318 and 320, as controlled by arbitration and control module 312, operate in the particular case when memory banks 314 and 316 must read consecutive N length data packets. In normal operation, data packets in memory banks 314 and 316 are aligned to 3*(N) boundaries, and the first word of a data packet is aligned to word 0 of a memory bank. Switches 318 and 320 are employed to read from the corresponding one of word offsets 0 and 1 of memory banks 314 and 316 to read a consecutive data packet of size N. As described herein, in the case of a packet retransmission, word offset 0 of each memory bank might not be available to write data in a given clock cycle, as word offset 0 of one of the memory banks might be read in two consecutive clock cycles. Thus, the first word of a subsequent packet might be stored in word offset 1 of one of memory banks 314 and 316, rather than word offset 0, if the current packet and the subsequent packet are both of length N.

The exemplary data flow shown in FIG. 11 shows a later clock cycle, clock cycle 10, of the exemplary data flow shown in FIGS. 6-10. Write packet data word $P_W(8)$ is stored in staging register 302. Mux 310 is set to select staging register 302(3) to provide data word $P_W(8)$ to word offset 314(3) of memory bank 314. A next word of the write packet, $P_W(9)$, arrives at Data In. Mux 322 is set to select the output of memory bank 314, and the last three data words $P_R(24)$, $P_R(25)$ and $P_R(26)$ are provided from the output port of memory 314 to Data Out. Data words $P_R(0)$, $P_R(1)$ and $P_R(2)$, the head of the read packet, remain cached in hold register 324. The last three data words of the $R^{th}$ read packet, shown as $P_R(24)$, $P_R(25)$ and $P_R(26)$, are still in the output register of memory bank 314.

Memory bank 316 reads the first three data words of the next packet, packet R+1, shown as read packets $P_{R+1}(0)$, $P_{R+1}(1)$ and $P_{R+1}(2)$. However, read packet R is to be retransmitted, starting from the head of the packet, data words $P_R(0)$, $P_R(1)$ and $P_R(2)$. FIFO input buffer 300 might determine whether a packet should be retransmitted based on the Rewind_Control signal that is provided to arbitration and control module 204, as shown in FIG. 2. Retransmission might occur, for example, when a data packet is multi-cast to multiple outputs of switch fabric 102.

FIG. 12 shows clock cycle 11 of the exemplary data flow of FIFO input buffer 300. Write packet data word $P_W(9)$ is stored in staging register 302. A next word of the write packet, $P_W(10)$, arrives at Data In. Data words $P_R(0)$, $P_R(1)$ and $P_R(2)$, the head of the read packet, remain cached in hold register 324. The first three data words of read packet R+1, $P_{R+1}(0)$, $P_{R+1}(1)$ and $P_{R+1}(2)$, are in the output register of memory bank 316. However, memory bank 316, now configured for the retransmission of read packet R, reads data words $P_R(3)$, $P_R(4)$ and $P_R(5)$, instead of memory bank 314 reading packets $P_{R+1}(3)$, $P_{R+1}(4)$ and $P_{R+1}(5)$, as would happen for normal operation. Since reading from a memory bank takes one clock cycle, memory bank 314 had previously computed read addresses for the next words of packet R+1. When the EOP control bits are detected, memory bank 316 is instead configured to read $P_R(3)$, $P_R(4)$ and $P_R(5)$. Thus, memory bank 316 is read twice consecutively in this exemplary case of a packet retransmission. Writing of data words $P_W(9)$ and $P_W(10)$ is held, and both data words $P_W(9)$ and $P_W(10)$ are stored in staging register 302. Mux 322 is set to select data words $P_R(0)$, $P_R(1)$ and $P_R(2)$, the head of the read packet, from hold register 324, and the first three data words of packet R, $P_R(0)$, $P_R(1)$ and $P_R(2)$, are provided from the output port of memory 314 to Data Out, thus facilitating packet retransmission.

FIG. 13 shows clock cycle 12 of the exemplary data flow of FIFO input buffer 300. Write packet data words $P_W(9)$ and $P_W(10)$ are stored in staging register 302. A next word of the write packet, $P_W(11)$, arrives at Data In. Mux 308 is set to select staging register 302(3) to provide data word $P_W(9)$ to input word offset 316(1) of memory bank 316. Mux 306 is set to select staging register 302(2) to provide data word $P_W(10)$ to input word offset 316(2) of memory bank 316. Mux 310 is set to bypass staging register 302(3) to provide data word $P_R(11)$ to input word offset 316(3) of memory bank 316. Mux 322 is set to select the output of memory bank 316, and data words $P_R(3)$, $P_R(4)$ and $P_R(5)$ are provided from the output port of memory 316 to Data Out. Data words $P_R(3)$, $P_R(4)$ and $P_R(5)$ are still in the output register of memory bank 316. The last three data words of packet R, $P_R(24)$, $P_R(25)$ and $P_R(26)$, might still be stored in the output port of memory 314. Memory Bank 314 reads the next three data words of packet R, $P_R(6)$, $P_R(7)$ and $P_R(8)$. Subsequent clock cycles might be processed substantially similarly as shown in FIGS. 6-10.

Figure 14:
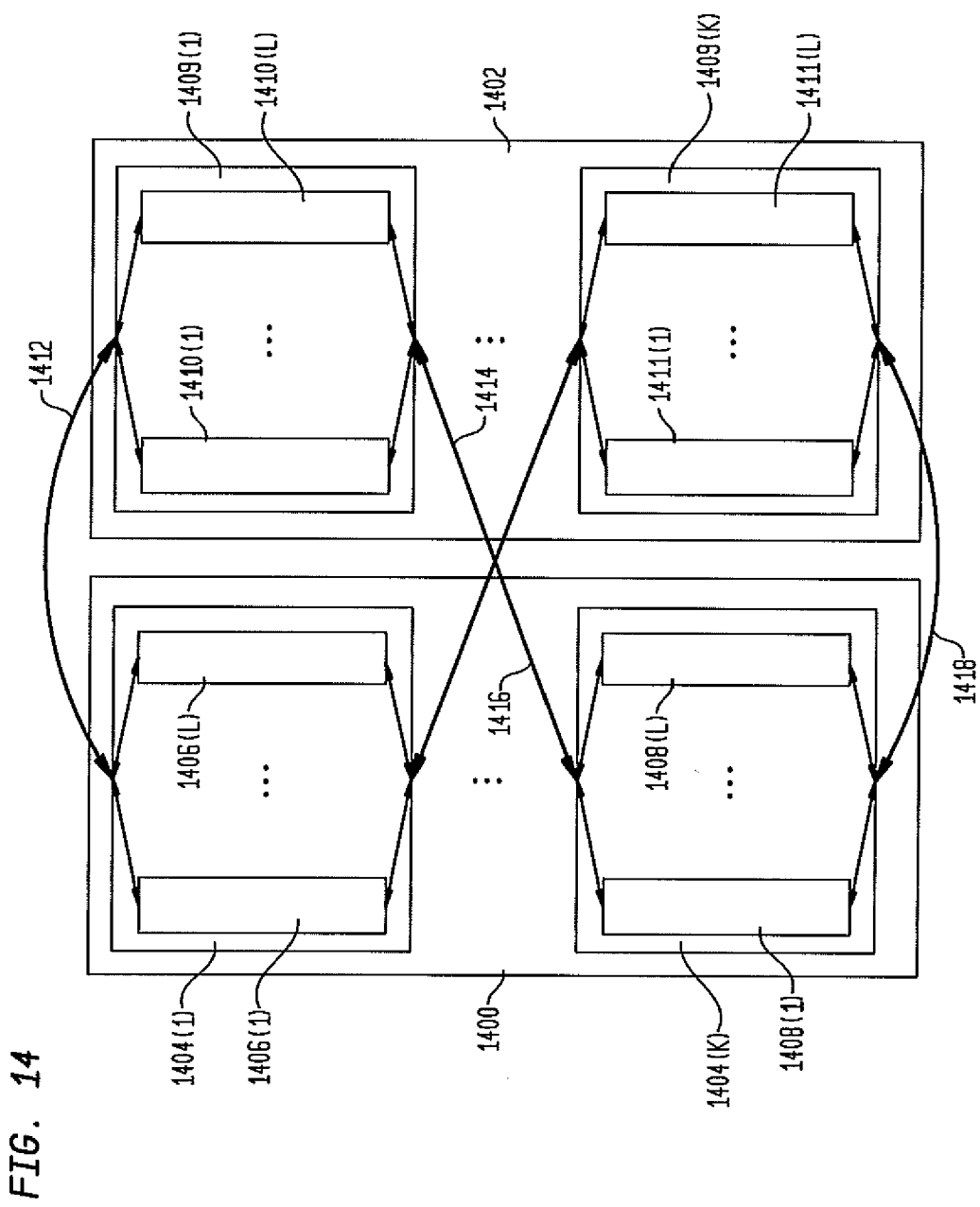
FIG. 14 shows a switch system operating in accordance with exemplary embodiments of the present invention; and, FIG. 15 shows another switch system operating in accordance with exemplary embodiments of the present invention.

While described above as being implemented as a monolithic chip, the present invention is not so limited. For example, as shown in FIG. 14, a switch fabric with I/O FIFO buffers as described herein might occupy its own circuit board, shown as switch cards 1406(1) through 1406(L). Multiple switch cards might occupy a shelf, with multiple shelves, shown as shelves 1404(1) through 1404(K), forming switch chassis 1400. Similarly, the processors and memories might be located on line chassis 1402. Line chassis 1402 might include multiple shelves, shown as shelves 1409(1) through 1409(K), each shelf including multiple line cards, shown as line cards 1410(1) through 1410(L). Each line card might contain devices, such as memory or processors, which communicate via the switch cards. A line chassis typically communicates with a switch chassis via electrical cables or optical links, shown as links 1412, 1414, 1416 and 1418.

Figure 15:
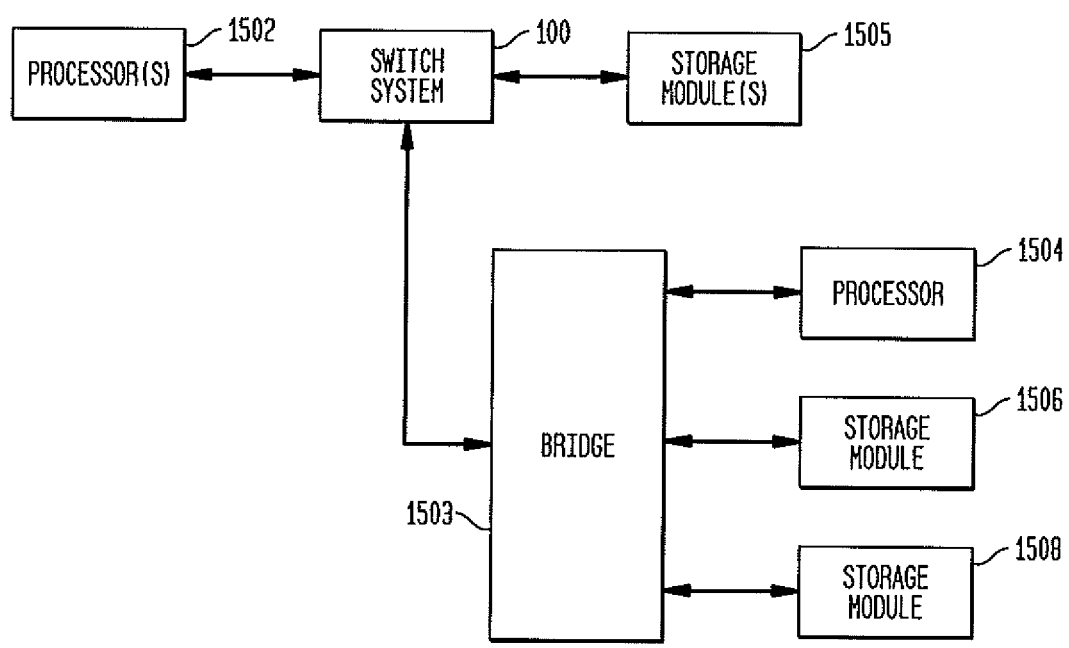

FIG. 15 shows another switch system operating in accordance with exemplary embodiments of the present invention. As shown in FIG. 15, one or more switch fabric systems, such as a switch fabric with I/O FIFO buffers as described herein and shown as 100, might be used to link a chain of processors 1502 and storage modules 1505 where a storage module might serve as a buffer for two processors to communicate with each other. Switch system 100 operates as described with regard to FIG. 1. Switch system 100 might also be in electrical communication with bridge 1503, thus, creating a branch along the chain. Bridge 1503 might employ one or more switch fabrics with I/O FIFO buffers to implement high-bandwidth ports for communication with switch system 100, and lower bandwidth ports for communication with slower or legacy data modules, shown as processor 1504 and storage modules 1506 and 1508. Thus, embodiments of the present invention provide a way for slower data modules to communicate with faster data modules without limiting the system bandwidth available to the faster data modules.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A first-in, first-out (FIFO) buffer system for packet switching in a crossbar switch with a speedup factor of m, where m is an integer greater than one, the FIFO buffer system comprising:

an arbitration and control module configured to control the flow, through a first logic module, of m N-bit data portions from a switch fabric, the m N-bit data portions comprising one or more N-bit data words corresponding to one or more data packets;

a staging register to buffer a received data portion;

a plurality of one-port memory banks configured to store the received data portions of the one or more data packets, each one-port memory bank having a width W and each being segmented into S portions each having a width W/S, W/S related to the width of the N-bit data word; and a second logic module configured to provide one or more N-bit data words, read from the plurality of one-port memory banks, corresponding to the received m N-bit data portions, wherein in a sequence of clock cycles, the one or more data portions are alternately transferred from corresponding selected segments of the plurality of one-port memory banks in a round-robin fashion, and, for each clock cycle, the second logic module constructs data out read from the plurality of one-port memory banks.

2. The invention as recited in claim 1, wherein the N-bit data words include one or more control bits.

3. The invention as recited in claim 1, wherein m is equal to three.

4. The invention as recited in claim 1, wherein the number of memory banks is equal to m, and W is equal to 2*N.

5. The invention as recited in claim 1, wherein the number of memory banks is equal to 2, and W is equal to 3*N.

6. The invention as recited in claim 1, wherein the plurality of one-port memory banks comprise pipelined random access memory (RAM) having flip-flop input and output registers.

7. The invention as recited in claim 6, wherein the pipelined RAM is configured to have write-through disabled such that the memory output remains constant until the memory is read.

8. The invention as recited in claim 1, wherein the arbitration and control module is configured to prioritize write accesses of the plurality of one-port memory banks, and wherein the arbitration and control module is configured to prefetch one or more N-bit data words for subsequent read accesses.

9. The invention as recited in claim 1, wherein the arbitration and control module is configured to bypass the plurality of one-port memory banks when the m one-port memories are empty.

10. The invention as recited in claim 1, wherein the staging register is adapted to align write accesses to the 2*N data width of the memory banks.

11. The invention of claim 1, wherein the first logic module comprises a demultiplexer, and the second logic module comprises a multiplexer.

12. The invention of claim 1, wherein the apparatus is implemented in a monolithic integrated circuit chip.

13. A method of providing a first-in, first-out (FIFO) buffer system for packet switching in a crossbar switch with a speedup factor of m, where m is an integer greater than one, the method comprising:

receiving, m*N-bit data from a switch fabric, the m*N-bit data corresponding to one or more data packets;

controlling, by an arbitration and control module, the flow through a first logic module, of the m*N-bit data, wherein write accesses are prioritized over read accesses to m one-port memory banks;

storing, in a corresponding one of the plurality of one-port memory banks, the received N-bit data words of the one or more data packets, each one-port memory bank having a width W and each being segmented into S portions each having a width W/S, W/S related to the width of the N-bit data word;

alternately transferring, in round-robin fashion by a second logic module in a sequence of clock cycles, the one or more data portions from corresponding selected segments of the plurality of one-port memory banks; and, constructing, by the second logic module for each clock cycle, N-bit data out read from the plurality of one-port memory banks.

14. The invention as recited in claim 13, further comprising prefetching one or more N-bit input data words from the m one-port memory banks for corresponding read accesses.

15. The invention as recited in claim 13, further comprising buffering, in a staging register, a received N-bit data word to align write accesses to the 2*N data width of the memory banks.

16. The invention as recited in claim 13, wherein, for the method, W is equal to 2*N.

17. The invention of claim 13, wherein the method is implemented by a machine executing program code encoded on a non-transitory machine-readable storage medium.

* * * * *